United States Patent Office 3,174,079
Patented Mar. 16, 1965

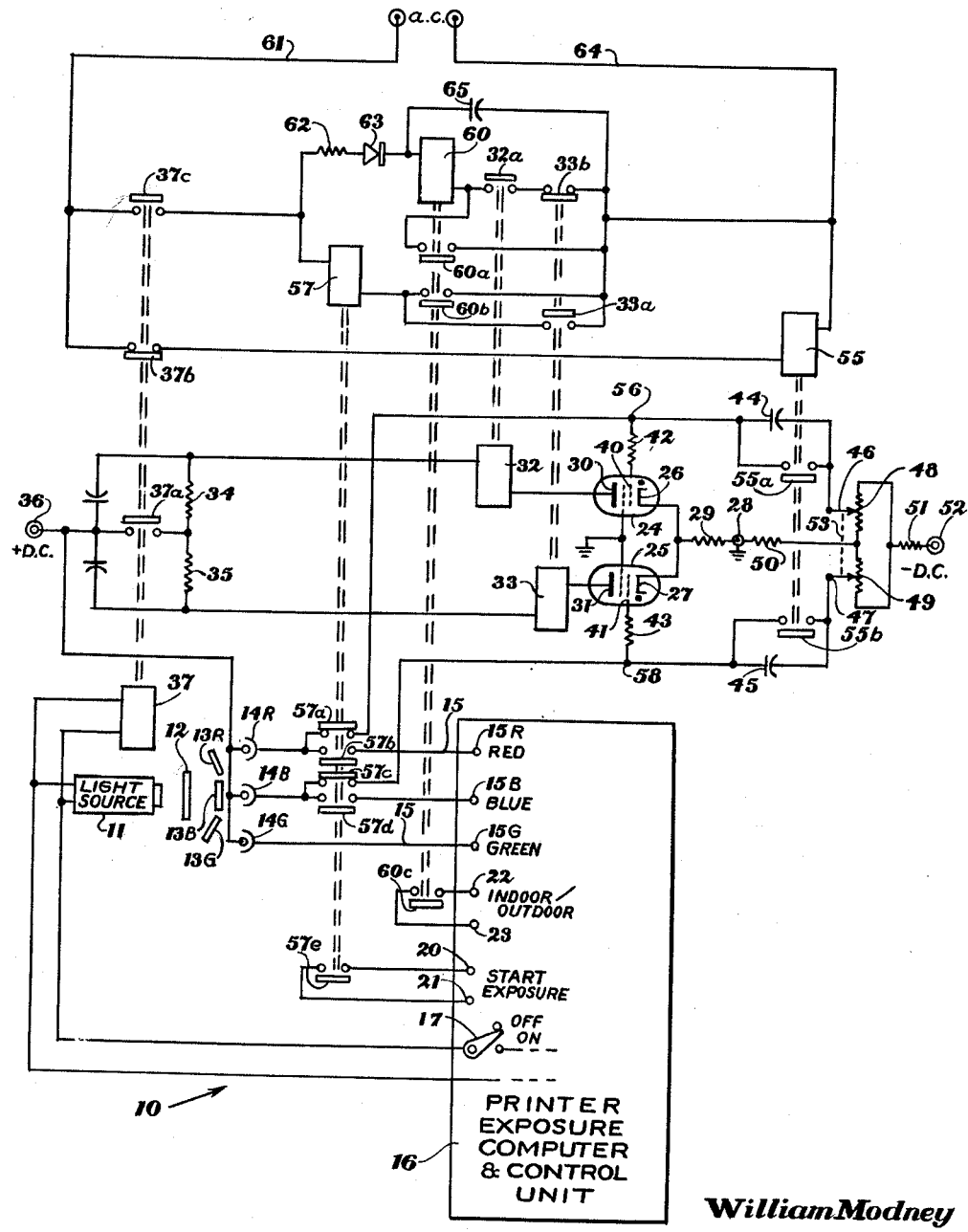

3,174,079
PHOTOELECTRIC DISCRIMINATOR
William Modney, Rochester, N.Y., assignor to Eastman Kodak Company, Rochester, N.Y., a corporation of New Jersey
Filed Sept. 14, 1961, Ser. No. 138,148
11 Claims. (Cl. 317—127)

This invention relates to a photoelectric discriminator and particularly to such a discriminator adapted for use in conjunction with a photographic color printer for supplying to the printer exposure control system information as to whether a negative which is to be printed was originally exposed by daylight or by flash lamp.

In color photography there have recently come into general use photographic films which may be exposed by either daylight or flash lamps and yet which require the use of no special filters. However the light from a flash lamp is of different color characteristics than that of daylight and, as a result, modification of the printing exposures for the individual color components must be made in accordance with which type of original exposure was involved. Printers which include provisions for changing the individual color exposures to correct for either type of original exposure are on the market and in use and are ordinarily provided with an Indoor/Outdoor switch or switch-controlled relay which may be placed in either of two operating conditions to convert the printer from one type of operation to the other.

It is an object of this invention to provide, for use in conjunction with such printers, means for automatically determining which type of original exposure was involved and for setting the Indoor/Outdoor control circuit of the printer for the corresponding type of operation.

It is a further object of this invention to provide a photoelectric discriminator which may be readily adapted for use in conjunction with color printers of the above type with a minimum of modification therefor.

A further object is to produce such a discriminator unit which uses relatively few readily available parts and yet which performs its desired function most effectively.

A further object is to provide such a discriminator unit which is responsive to the over-all red and blue densities in a negative transparency to be printed and which includes a pair of time-voltage integrating circuits which conrol the triggering voltage of one or the other of a pair of thyratrons in accordance with such densities in the transparency.

A still further object is to provide such a discriminator so arranged that when one of the thyratrons fires, the other will be effectively prevented from firing throughout the remainder of that printing cycle.

Further objects will become apparent from the following description and claims particularly when considered in the light of the accompanying drawing wherein:

The single figure shows in diagrammatic form the discriminator of my invention associated with pertinent portions of a photographic color printer.

In order to best understand the operation of my improved discriminator unit, I have shown it in the drawing as applied to a conventional photographic color printer of the type provided with an Indoor/Outdoor control circuit.

No attempt has been made to show the printer exposure control system nor the details of the Indoor/Outdoor control circuitry incorporated therein, since these details have no direct bearing upon an understanding of the present invention. Such systems are known in the art and description of a representative system may be found in the copending application of Huboi and Goddard, Serial No. 774,189, filed November 17, 1958, now Patent No. 3,029,691. Only so much of a printer has been diagrammatically shown as in believed necessary to a proper understanding of the invention.

Thus the printer 10 includes the usual printing source 11 of "white" light which is adapted to be directed through a negative transparency 12 and a suitable optical system (not shown) onto a strip of sensitized paper also not shown. In such printers, as is well known in the art, it is customary to take some of the light passing through the negative transparency, analyze it by color, and use the resulting information to control the actual printing exposures for the individual color components. Thus such printers are normally provided with color filters 13R, 13B and 13G, corresponding to the colors red, blue and green, respectively, which pass light of the corresponding color to associated photocells 14R, B and G, respectively. The output signals from these photocells are normally applied as indicated at 15 to the color input terminals 15R, 15B and 15G of the exposure computer and control unit 16, the output of which serves to control the individual color exposures by conventional means (not shown) such as suitable color-selective filters or by varying the color composition of the light from source 11. As diagrammatically indicated, the control unit 16 will ordinarily be provided with a suitable switch 17 for controlling the light source 11, a pair of exposure start terminals 20, 21 which, when connected together, serve to initiate the actual printing exposure, and a pair of terminals 22 and 23 associated with the Indoor/Outdoor color correction circuitry for controlling the mode of operation in accordance with the original exposure of the negative.

It has been found that the ratio of the red and blue densities in a negative transparency may be used as an indication of whether the negative was originally exposed by a flash lamp or by daylight. The discriminator of this invention provides a highly effective means for sensing this ratio and for developing a control signal which, in this case, comprises energization of a relay, to effectively indicate to the printer control unit which type of exposure was originally involved.

As shown in the drawing my improved discriminator comprises a pair of thyratrons 24, 25 the cathodes 26, 27 of which are connected directly together and then connected to ground or a point of intermediate D.C. potential 28 by means of a common cathode resistor 29. The anodes 30, 31 are connected through individual relays 32, 33 and current limiting resistors 34, 35 to a source of positive D.C. voltage 36, the anode circuits being conjointly controlled by the normally open points 37a of a relay 37. Thyratrons 24, 25 include the usual trigger control electrodes or grids 40, 41 which are connected through resistors 42, 43 to individual voltage-time integrating circuits, the active elements of which are constituted by a pair of capacitors 44, 45 and the red and blue photocells 14R and 14B. Capacitors 44, 45 are connected at one side as at 46, 47 to a variable source of negative D.C. potential provided by potentiometers 48, 49, and have their other sides individually connected through normally closed contacts 57a and 57c of a relay 57, to the cathodes of the above-mentioned photocells 14R and 14B, the anodes of which are connected to the source 36 of positive D.C. voltage. Potentiometer 48, 49 may conveniently constitute a portion of a voltage divider network connected between ground terminal 28 and a negative D.C. terminal 52 and which includes a pair of resistors 50 and 51 in series with the parallel-connected potentiometers 48 and 49. Potentiometers arms 46, 47 are preferably mechanically connected together as diagrammatically indicated at 53 so that when the voltage on one of these arms is varied in one sense that on the other arm will vary in the opposite sense. Capacitors 44 and 45 are arranged to be shunted by the normally open contacts 55a and 55b of a relay 55 which, as will later appear, will be energized except for the relatively brief period at the start of a printing cycle, during which the discriminator is rendered effective.

Relay 32, which will be energized whenever thyratron 24 fires, is arranged to energize a changeover relay 60 the points 60c of which are arranged, when actuated, to connect together the Indoor/Outdoor control terminals 22 and 23 on the control unit 16. Relay 60 also includes a normally open contact 60a which serves as a self-holding contact for relay 60 once it has been energized. An additional set of normally open contacts 60b serve upon closing, to energize relay 57 to transfer the output from the photocells 14R and 14B from the discriminator unit to the terminals 15R and 15B of the printer exposure control unit 16, and, by its points 57e to start an actual printing exposure.

Relay 33, in the anode circuit of thyratron 25, is provided with a pair of normally closed contact points 33b which serve as interlocks in the pick-up circuit for relay 60, and a pair of normally open contact points 33a which serve as additional pickup points for relay 57.

Relay 60 obtains its energizing voltage from a suitable source of alternating current supplied by the lines 61 and 64. However, since it is desired that this relay 60 provide a slight time delay upon de-energization, it is supplied with rectified current through a resistor 62 and rectifier 63, and is shunted by a capacitor 65. Since relays 55 and 57 do not require any time delay action, they are conveniently energized directly from the alternating current supply as indicated in the diagram.

As will later be shown, at the termination of a printing operation, relay 55 will be energized by the closing of contact points 37b when the light source 11 is extinguished. Energization of relay 55 will cause its contact points 55a and b to short out and discharge the integrating capacitors 44 and 45 and to apply the negative blocking bias from potentiometers 48, 49 to the trigger electrodes 40, 41 of thyratrons 24, 25. To start a new cycle of operation, when a transparency 12 has been positioned at the printing gate, switch 17 will be closed to energize the light source 11 and to energize relay 37, connected in parallel thereto. Closing of contact points 37a will apply anode potential to the thyratrons 24 and 25 while opening of the contacts 37b will simultaneously cause de-energization of relay 55, to thereby open contacts 55a and b to remove the shunting connections about the integrating capacitors 44 and 45. Capacitors 44 and 45 will thereupon begin to charge so that the voltages at points 56 and 58 on the integrating networks will rise in the positive direction at rates depending upon the relative red and blue densities present in the transparency 12 and the resulting resistances of the associated photocells 14R and 14B.

If the transparency was originally exposed by flash bulb, it will normally have a relatively high over-all red density and the ratio of red light to blue light passing through the transparency will be considerably smaller than would be the case with a transparency which had been exposed originally by daylight. Under these conditions the resistance of photocell 14R will normally be somewhat greater than that of 14B and, as a result, capacitor 45 in the blue integrating circuit will charge at a relatively greater rate than capacitor 44. The bias voltages provided by potentiometer arms 46, 47 will be so adjusted that, under these circumstances, the voltage at point 58 and which is applied to control electrode 41 of thyratron 25, will reach the triggering value sooner than that applied to control electrode 40 of thyratron 24. Therefore thyratron 25 will fire and will cause energization of relay 33. This will in turn close the contacts 33a to energize exposure start control relay 57, and will open the interlock contacts 33b to prevent energization of relay 60 during the remainder of this cycle of operation. Energization of relay 57 in effect signals the end of the discriminating operation and, as previously described, by operation of its contacts 57a–d transfers the outputs of photocells 14R and 14B from the integrating capacitors 44, 45 to the normal exposure computer color input terminals 15R and 15B on printer unit 16. Relay 57 also closes its contacts 57e to start the actual printing exposure cycle. At the end of the printing cycle light source 11 will be extinguished either as by opening switch 17, or by operation of conventional control circuitry (not shown) incorporated in control unit 16, and relay 37 will again be de-energized to open its contacts 37a and c to drop relays 33 and 57, and close its contacts 37b to again energize relay 55 to discharge capacitors 44 and 45 in readiness for another cycle of operation.

If, on the other hand the transparency 12 had been originally exposed under daylight conditions, the ratio of red to blue densities therein would be somewhat smaller than before, resulting in relatively lower resistance in photocell 14R and higher resistance in photocell 14B. Under these conditions timing capacitor 44 will charge to its triggering value sooner than capacitor 45 and thyratron 24 will therefore be fired to energize its associated relay 32. Closing of the points 32a of relay 32 will energize relay 60 which, as previously described, then becomes self-holding through its own contact points 60a. Energization of relay 60 will also close its contact points 60c to shunt the Indoor/Outdoor control terminals 22, 23 to set the exposure computer unit 16 for "outdoor" operation. Closing of the contact points 60b of relay 60 will also energize the changeover relay 57 which, as previously described, will transfer the photocell outputs to the exposure computer unit and will cause the start of an actual printing exposure cycle. At the end of this printing cycle relay 37 will again be de-energized as previously described to prepare the unit for another cycle of operation.

Regardless of which thyratron is first triggered, the arrangement is such that the other thyratron will be effectively prevented from firing during that same cycle of operation. This result is obtained by virtue of the use of the common cathode resistor 29. This resistance is of such value that, when either thyratron fires, the voltage drop across resistor 29 will be sufficient to raise the cathode potential of the other thyratron to a point such that its triggering electrode will be incapable of causing a triggering action. A secondary interlocking action is moreover provided by the interlock 33b as previously mentioned. If, in the case of an unusual negative, the two thyratrons should be triggered at the same instant, contacts 33b of relay 33 would open slightly ahead of the closing of contacts 32a of relay 32 and would therefore prevent energization of the changeover relay 60. Thus relay 60, which initiates the changeover of the printer circuitry from normal or "indoor" operation to "outdoor" operation, can only be energized when thyratron 24, controlled by the red photocell 14R, is fired ahead of thyratron 25. As previously explained, this condition will ordinarily occur only when the ratio of red light to blue light passing through the transparency is at the higher level corresponding to exposure of the negative to daylight conditions. The particular ratio of red to blue negative density which will thus cause energization of thyratron 24 and a resulting changeover of the printer from normal Indoor to Outdoor operation, can be very readily and accurately adjusted to a predetermined value by appropriate adjustment of the potentiometer arms 46 and 47.

From the above, it is believed apparent that the photoelectric discriminator of my invention satisfies the objects set forth at the beginning of this specification. While this unit has been described as being particularly suitable for use as an Indoor/Outdoor discriminator for use in conjunction with a photographic color printer, it is obvious that it could be used for many other purposes. However it is so constructed and arranged that it may be used with such color printers with a minimum of modification of the printers.

Obviously many modifications in the specific construction and circuitry could be made by those skilled in the art without invention and without departing from the spirit and scope of the invention as defined by the appended claims.

I claim:

1. A photoelectric discriminator comprising a pair of trigger tubes having anode, cathode and trigger electrodes; circuit means for applying operating potential between the anode and cathode of each of said tubes and including a control relay in series with the anode of one of said tubes; means for individually controlling the potential of the triggering electrode of each tube with respect to its cathode comprising a capacitor and a photocell associated with the triggering electrode of each tube, and means for simultaneously causing each of said capacitors to begin to charge from an initial value toward a triggering value at a rate controlled by the illumination on its associated photocell; and means responsive to firing of either of said trigger tubes for rendering the other incapable of being fired by its triggering circuit.

2. A discriminator as in claim 1 wherein said last-mentioned means comprises a cathode biasing resistor common to both tubes and forming a portion of said circuit means for applying operating potentials to said tubes and connected in series with the cathodes of both said tubes.

3. A photoelectric discriminator comprising a pair of photocells, a pair of capacitors, and means connecting each said capacitors in a charging circuit with the corresponding one of said photocells, means for simultaneously rendering said charging circuits effective to initiate charging of said capacitors at rates corresponding to the illumination on their associated cells, a pair of normally non-conductive thyratrons having firing control grids connected to said charging circuits whereby each thyratron will be fired only when the charge on its associated capacitor reaches a predetermined value, a control relay connected in circuit with one of said thyratrons for energization upon firing thereof, and means responsive to firing of either of said thyratrons for rendering the other incapable of being fired by its associated charging circuit.

4. A photoelectric discriminator as in claim 3 wherein each of said capacitors is connected between the associated firing control grid and a source of negative bias potential, and switch means are provided for selectively shunting or unshunting both of said capacitors simultaneously to respectively render said discriminator inoperative or operative.

5. A photoelectric discriminator as in claim 4 wherein the relative negative bias potential applied to said control grids by said source may be varied to vary the response to said discriminator to differences in outputs from said photocells.

6. A photoelectric color discriminator comprising a pair of thyratrons, each having anode, cathode and trigger electrodes, means for applying operating potentials between said anode and cathode electrodes and including a relay in series with the anode of one of said thyratrons and adapted to be energized upon firing of said one thyratron, means for controlling the potential of the trigger electrodes of said thyratrons relative to their respective cathodes comprising a pair of photocells respectively responsive to light of different colors, and means including said photocells for simultaneously causing the potentials of said trigger electrodes to commence to change from predetermined initial values toward thyratron-firing values at rates controlled respectively by said photocells, and interlock means effective upon firing of either of said thyratrons to render the other incapable of being fired by its associated trigger electrode potential control means.

7. A photoelectric color discriminator as in claim 6 wherein said interlock means comprises means responsive to anode current flow in either thyratron for applying a trigger-blocking bias between the trigger and cathode electrodes of the other thyratron.

8. A photoelectric color discriminator as in claim 7 wherein said interlock means comprises a cathode bias resistor common to both said thyratrons.

9. A photoelectric discriminator comprising relatively positive, negative and intermediate potential supply terminals, a pair of thyratrons having anode, cathode and firing control electrodes, means connecting the anodes of said thyratrons to said positive terminal and including a relay in series with the anode of one of said thyratrons, means including a resistor connected at one end to both of said cathodes and at its other end to said intermediate potential terminal, a voltage-time integrating circuit associated with each of said thyratrons for controlling the firing thereof, each of said circuits comprising a photocell and a capacitor connected in series between said positive and negative potential terminals, means connecting the firing control electrode of the associated thyratron to a point in the circuit between said photocell and capacitor, and switch means associated with said integrating circuits for simultaneously rendering them operative to cause charging of said capacitors toward a predetermined firing potential at rates controlled respectively by said photocells.

10. A photoelectric discriminator comprising a pair of photocells, a pair of capacitors, and means connecting each of said capacitors in a charging circuit with the corresponding one of said photocells, means for simultaneously rendering said charging circuits effective to initiate charging of said capacitors at rates corresponding to the illumination on their associated cells, a pair of normally non-conductive thyratrons having firing control grids connected to said charging circuits whereby each thyratron will be fired only when the charge on its associated capacitor reaches a predetermined value, a relay, circuit means for energizing said relay only in response to firing of a predetermined one of said thyratrons and means responsive to firing of either of said thyratrons for rendering the other incapable of being fired by its associated charging circuit.

11. A photoelectric discriminator as in claim 10 including a second relay and circuit means for energizing said second relay in response to firing of either of said thyratrons.

References Cited by the Examiner
UNITED STATES PATENTS

| | | | |
|---|---|---|---|
| 2,006,737 | 7/35 | Gessford | 328—72 XR |
| 2,059,562 | 11/36 | Curtis et al. | 315—340 XR |
| 2,162,508 | 6/39 | Knowles | 315—340 XR |
| 2,350,888 | 6/44 | Hall | 328—251 XR |

SAMUEL BERNSTEIN, *Primary Examiner.*

A. GAUSS, *Examiner.*